United States Patent [19]
Kalz et al.

[11] Patent Number: 5,912,386
[45] Date of Patent: Jun. 15, 1999

[54] BRIDGED ANTHRAQUINONES

[75] Inventors: Dietmar Kalz, Neunkirchen; Karl-Heinz Reinhardt, Monheim; Helmut Bläser, Bergisch Gladbach, all of Germany

[73] Assignee: Bayer Aktiengesellschaft, Leverkusen, Germany

[21] Appl. No.: 09/019,571

[22] Filed: Feb. 6, 1998

[30] Foreign Application Priority Data

Feb. 13, 1997 [DE] Germany ............ 197 05 389
Aug. 29, 1997 [DE] Germany ............ 197 37 724

[51] Int. Cl.⁶ ............................................. C07C 209/38
[52] U.S. Cl. ................... 564/308; 564/427; 564/452; 564/457; 564/459
[58] Field of Search .................. 564/308, 427, 564/452, 457, 459

[56] References Cited

U.S. PATENT DOCUMENTS 3,312,655  4/1967  Dien ........................... 260/41
4,076,735  2/1978  Seha .......................... 260/378

FOREIGN PATENT DOCUMENTS 1381982  12/1964  France .
1103231  10/1955  Germany .
1018569  10/1957  Germany .

*Primary Examiner*—Brian M. Burn
*Attorney, Agent, or Firm*—Joseph C. Gil; Richard E.L. Henderson

[57] ABSTRACT

The present invention relates to compounds of the formula (I)

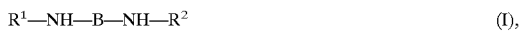

wherein $R^1$ and $R^2$ independently of one another denote an unsubstituted or substituted radical of the formula

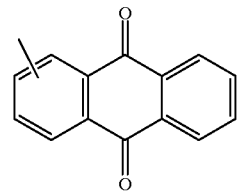

and B represents an unsubstituted or substituted cycloalkylene-containing bridge member, which are suitable for bulk dyeing of plastics.

15 Claims, No Drawings

BRIDGED ANTHRAQUINONES

BRIDGED ANTHRAQUINONES

The invention relates to bridged anthraquinones, processes for their preparation and their use for bulk dyeing of plastics.

N-Substituted 1-aminoanthraquinones are already known. For example, 1-cyclohexylaminoanthraquinone, which is described, for example, in DE-A-2 541 663, is indeed heat-stable in the range from 220 to 280° C. and furthermore has a good fastness to light when used for bulk dyeing of plastics (cf. FR-A 1 381 982), but it still has deficiencies in fastness to sublimation. As a result, at the processing temperature used, the dyestuff sublimes and contaminates the injection moulding machine, so that this has to be cleaned again in an expensive manner.

Bridged anthraquinones of the general formula (I)

wherein $R^1$ and $R^2$ independently of one another denote an optionally substituted radical of the formula

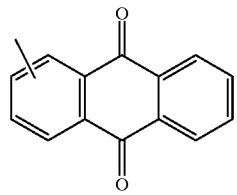

and

B represents an optionally substituted cycloalkylene-containing bridge member, have now been found.

Examples of possible substituents of the anthraquinone radicals $R^1$ and $R^2$ which may be mentioned are: OH, optionally substituted amino, aryloxy, in particular phenyloxy, halogen, in particular Cl, Br and F, alkyl, in particular $C_1$–$C_4$-alkyl, or alkoxy, such as $C_1$–$C_4$-alkoxy, each of the anthraquinone radicals being substituted independently of one another.

The anthraquinone radicals can preferably be substituted by 0 to 4 identical or different radicals. The radicals $R^1$ and $R^2$ are preferably identical. The radicals $R^1$ and $R^2$ are especially preferably unsubstituted.

Bridged anthraquinones of the formula (I) which correspond to the formula (Ia)

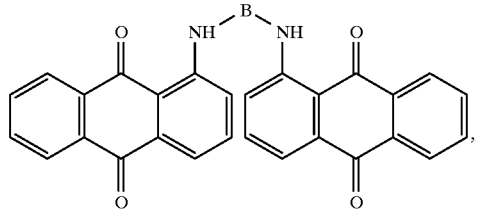

wherein

B has the abovementioned meaning, are preferred.

Bridged anthraquinones of the formula (I) which correspond to the formula (Ib)

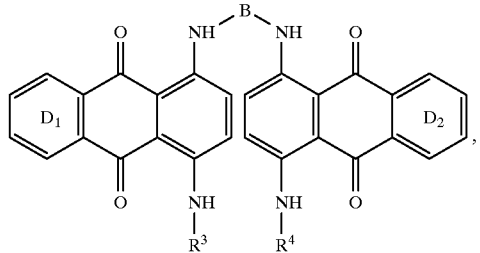

wherein

B has the abovementioned meaning, $R^3$ and $R^4$ independently of one another represent hydrogen, optionally substituted alkyl, aryl or aroyl and the rings $D_1$ and $D_2$ independently of one another are optionally substituted, are also preferred.

Compounds of the formula (Ib) wherein $R^3$ and $R^4$ independently of one another denote hydrogen, $C_1$–$C_4$-alkyl, which is unsubstituted or substituted by halogen and/or phenyl, in particular methyl, ethyl and phenylethyl, or phenyl or benzoyl which are unsubstituted or substituted by halogen, in particular Cl, Br and F, alky, in particular $C_1$–$C_4$-alkyl, such as methyl, ethyl, n-propyl, iso-propyl, n-butyl, sec-butyl, iso-butyl and tert-butyl, and/or acylamino, in particular acetylamino, are particularly preferred.

In a particularly preferred embodiment, the radicals $R^3$ and $R^4$ independently of one another represent:

hydrogen, phenyl, 4-methylphenyl, benzoyl and 4-methylbenzoyl.

Compounds of the formula (Ib) wherein the rings $D_1$ and $D_2$ are optionally substituted by halogen, such as Cl, Br and F, $C_1$–$C_4$-alkyl, such as methyl and ethyl, or acylamino, such as acetylamino, are furthermore particularly preferred.

However, the rings $D_1$ and $D_2$ are preferably unsubstituted.

Possible suitable substituents of the cycloalkylene radical in the bridge member B are, for example, $C_1$–$C_4$-alkyl, in particular methyl, and halogen, in particular Cl, Br or F.

Cycloalkylene which may be mentioned is, in particular, $C_5$–$C_7$-cycloalkylene, preferably cyclopentylene and 1,3- or 1,4-cyclohexylene.

The bridge member B can also additionally contain, in addition to one or more optionally substituted cycloalkylene units, other units, preferably one or more alkylene units, in particular $C_1$–$C_4$-alkylene units, it being possible for the alkylene units to be linear or branched.

If the bridge member B contains both cycloalkylene and alkylene units, they are preferably arranged side by side, and in particular are bonded to one another in alternating form.

Preferred compounds are those of the formula (I), in particular of the formulae (Ia) and (Ib), in which the bridge member B corresponds to a radical of the formula (II)

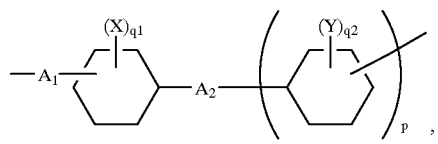
(II)

wherein q1 and q2 independently of one another represent a number from 0 to 4,

X and Y independently of one another denote alkyl, in particular $C_1$–$C_4$-alkyl, or halogen, in particular Cl, Br and F, where if q1 is greater than or equal to 2, X can in each case assume identical or different meanings, and if q2 is greater than or equal to 3, Y can in each case assume identical or different meanings, $A_1$ represents a linear or branched $C_1$–$C_4$-alkylene radical, in particular denotes

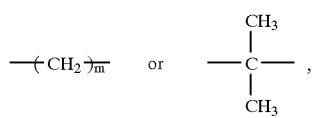

$A_2$ represents a linear or branched $C_1$–$C_4$-alkylene radical, in particular denotes

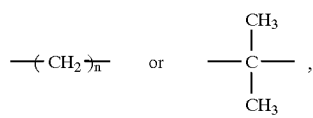

wherein m and n independently of one another represent a number from 0 to 4 and p denotes 0 or 1.

Particularly preferred compounds of the formula (I), in particular (Ia) and (Ib), are those wherein the cyclohexylene radical or radicals in the bridge member independently of one another are linked in the 1,3- or 1,4-position.

Especially preferred compounds of the formula (I) are those in which the bridge member B corresponds to one of the formulae (IIa) to (IIe):

(IIa)

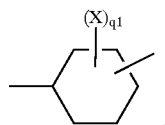

wherein
X and q1 have the abovementioned meaning, preferably
X represents chlorine or methyl and
q1 represents 0 or 1, (IIb)

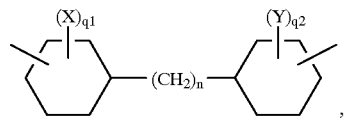

wherein
X, Y, q1, q2 and n have the abovementioned meaning, preferably
X and Y in each case denote methyl,
q1 and q2 independently of one another denote 0 or 1 and
n represents 0 or 1, in particular 1, (IIc)

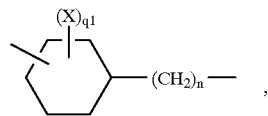

wherein
X, q1 and n have the abovementioned meaning, preferably
X represents methyl,
q1 represents 0, 1, 2 or 3 and
n represents 1, (IId)

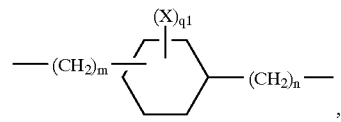

wherein
X, q1, m and n have the abovementioned meaning, preferably
m and n in each case denote 1,
X denotes methyl and
q1 represents 0 or 1, (IIe)

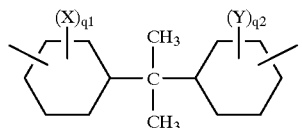

wherein
X, Y, $q_1$ and $q_2$ have the abovementioned meanings, preferably
X and Y denote methyl and
$q_1$ and $q_2$ independently of one another represent 0 or 1.

Possible preferred bridge members of the formula (II) are, for example, the following:

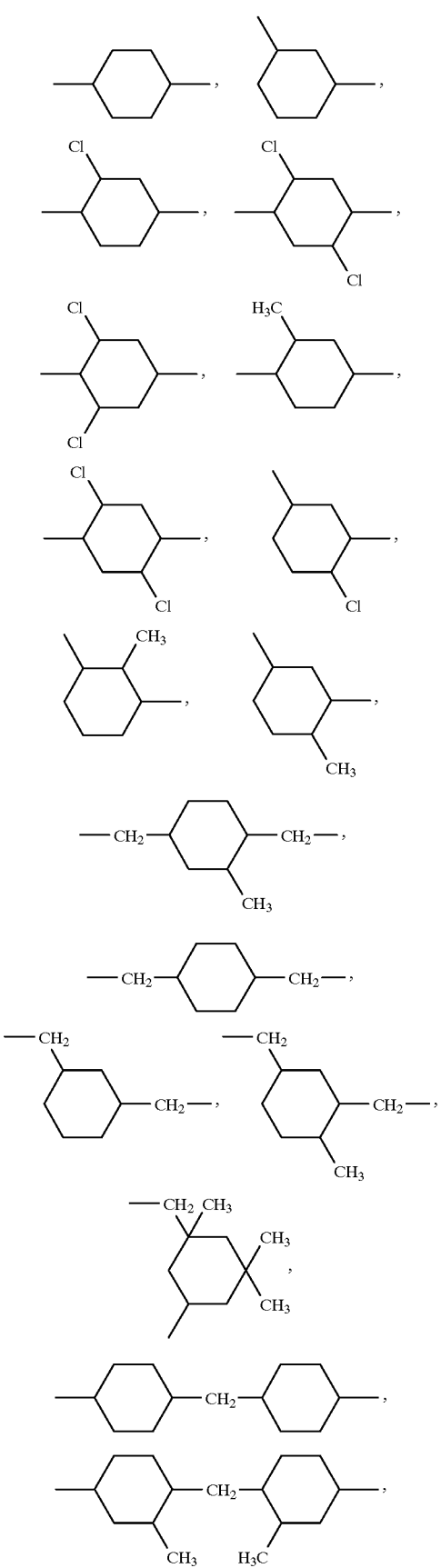
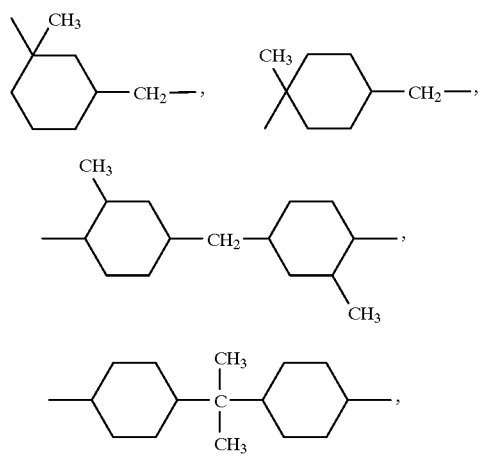
The invention furthermore relates to a process for the preparation of the compounds of the formula (I), which is characterized in that optionally substituted anthraquinone compounds of the formula (III)
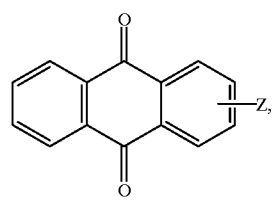
(III)
in particular those of the formula (IIIa)
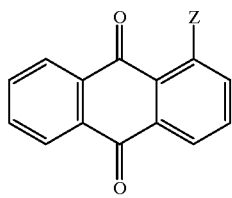
(IIIa)
or those of the formula (IIIb1) and/or of the formula (IIIb2)
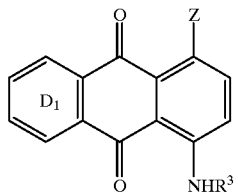
(IIIb1)

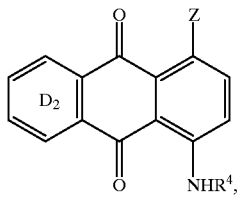

(IIIb2)

wherein

Z represents Cl, $NO_2$ or $SO_3M$, where M=an alkali metal, in particular K or Na, and $D_1$, $D_2$, $R^3$ and $R^4$ have the abovementioned meaning, are reacted with a diamine of the formula (IV)

$$H_2N-B-NH_2 \qquad (IV),$$

wherein

B has the abovementioned meaning, at a temperature of from 100 to 180° C., if appropriate in the presence of a solvent.

It is preferable to employ ½ a molar equivalent of the compound of the formula (IV) per mole of the compound (III). However, it may also be advantageous to employ the reactants in ratios of amounts which are other than the stoichiometric ratios. In particular, mixtures of the compound (III) can be employed, for example in order to obtain compounds of the formula (I) in which $R^1$ and $R^2$ are different. For example, if the diamine (IV) is simultaneously used as the solvent, this is present in excess.

Preferred diamines of the formula (IV) are those which contain the preferred bridge members B. Possible examples are:

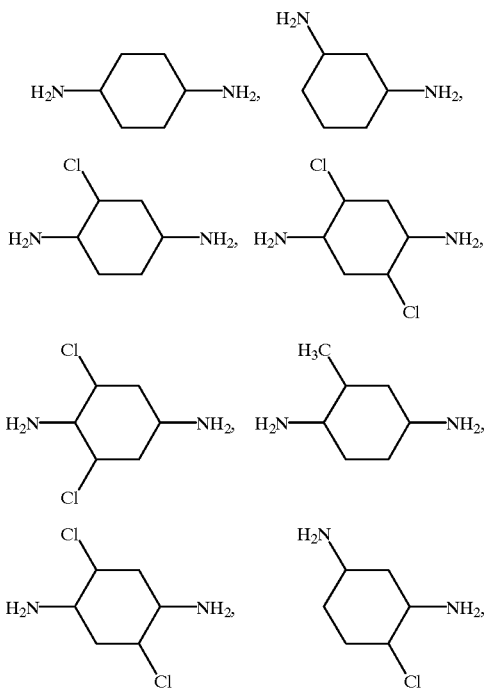

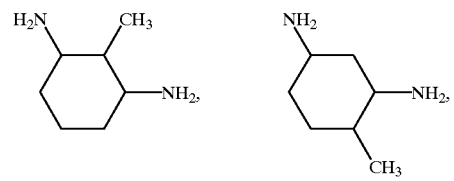

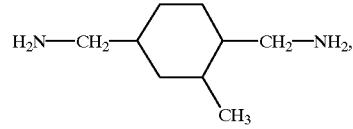

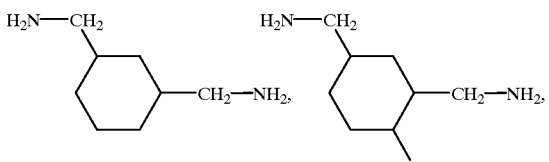

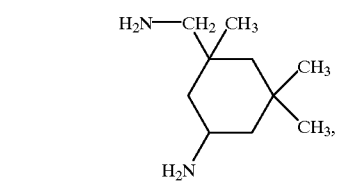

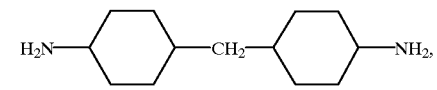

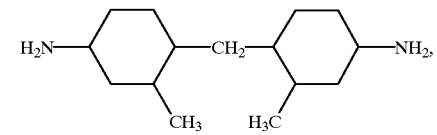

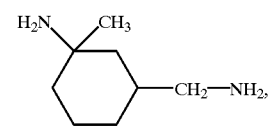

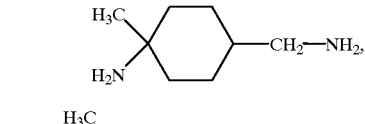

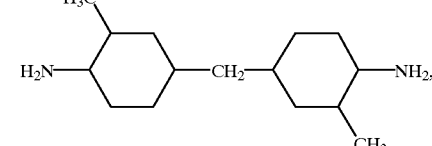

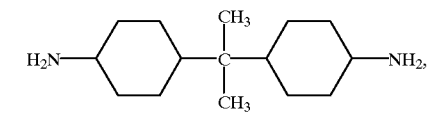

The process according to the invention can also be carried out in the presence of catalysts. Possible catalysts are, for example: copper powder, copper(I) chloride, copper(II) acetate, copper(II) sulphate or copper bronze powder.

Possible suitable solvents are, for example, water and/or organic solvents. Organic solvents which may be mentioned are, for example: optionally halogenated aromatics, such as o-dichlorobenzene, nitrobenzene, N-methylpyrrolidone (NMP) and dimethyl-formamide (DMF).

In a preferred embodiment of the process according to the invention, anthraquinones of the formula (Ia) or (Ib) are prepared.

The preparation of compounds of the formula (I) which correspond to the formula Ia by reaction of compounds of the formula (IIIa) wherein Z=SO$_3$M and M has the above meaning, in particular denotes K, with diamines of the formula (IV) at a temperature of from 90 to 150° C., in particular at 120 to 150° C., in water as the solvent, the reaction preferably being carried out under pressure, is particularly preferred. The reaction is preferably carried out in an autoclave. Pressures of from 2 to 6 bar are preferably established.

In this process variant, the reaction is particularly preferably carried out in the presence of an oxidizing agent, for example nitrobenzenesulphonic acid in the form of an alkali metal salt. This serves to convert the sulphite liberated during the reaction into sulphate.

The compound (I) thus prepared is then preferably isolated by filtration, washed with hot water and dried.

A process for the preparation of the compounds of the formula (I) according to the invention, in particular of the formula (Ib), characterized in that compounds of the formula (III), in particular of the formula (IIIb1) and/or (IIIb2), wherein Z represents NO$_2$ or Cl, are reacted with diamines of the formula (IV) at a temperature of from 90 to 180° C., in particular 140 to 160° C., in the presence of an organic solvent is also preferred.

The compound (I) thus prepared is then preferably isolated by filtration at room temperature, washed with methanol and dried.

It is advantageous to allow the reaction to proceed in the presence of alkali metal carbonates, such as K$_2$CO$_3$ or Na$_2$CO$_3$, or bicarbonates, such as KHCO$_3$ or NaHCO$_3$. Possible suitable solvents are, for example, NMP or DMF. When the reaction has ended, methanol is preferably added to the reaction mixture and the resulting compound (I) is filtered off at room temperature, washed with dilute hydrochloric acid and hot water and dried.

The invention furthermore relates to a process for the preparation of compounds of the formula (I), in particular those of the formula (Ib), characterized in that compounds of the formula (Ic)

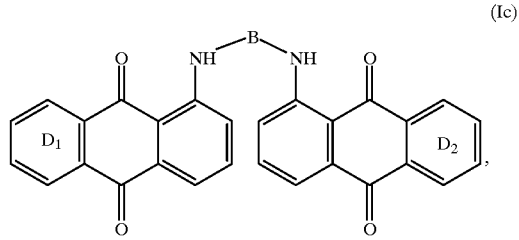

(Ic)

wherein

D$_1$, D$_2$ and B have the abovementioned meanings, are brominated to give compounds of the formula (Id)

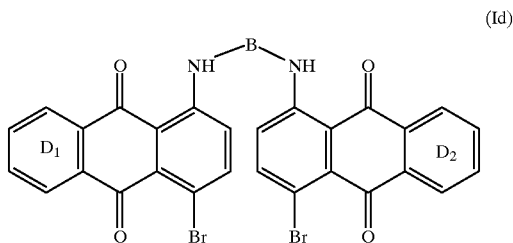

(Id)

and these are reacted with compounds of the formula

NH$_2$R$^3$ and/or NH$_2$R$^4$ wherein

R$^3$ and R$^4$ have the abovementioned meaning.

The dyestuffs according to the invention are outstandingly suitable for bulk dyeing of plastics. In this process, the dyestuffs of the formula (Ia) give red dyeings and those of the formula (Ib) give blue to violet dyeings.

Bulk dyeing is understood here as meaning, in particular, processes in which the dyestuff is incorporated into the molten composition of the plastic, for example with the aid of an extruder, or in which the dyestuff is already added to starting components for the preparation of the plastic, for example monomers before the polymerization.

Particularly preferred plastics are thermoplastics, for example vinyl polymers, polyesters, polyamides and polyolefins, in particular polyethylene and polypropylene, or polycarbonates.

Suitable vinyl polymers are polystyrene, styrene/acrylonitrile copolymers, styrene/butadiene copolymers, styrene/butadiene/acrylonitrile terpolymers, polymethacrylate, polyvinyl chloride and others.

Suitable polyesters are furthermore: polyethylene terephthalates, polycarbonates and cellulose esters.

Polystyrene, styrene copolymers, polycarbonates, polymethacrylates and polyamides are preferred. Polystyrene, polyethylene and polypropylene are particularly preferred.

The high molecular weight compounds mentioned can be present individually or as mixtures, as plastic compositions or melts.

The dyestuffs according to the invention are used in finely divided form, it being possible, but not necessary, to co-use dispersing agents.

If the dyestuffs (I) are employed after the polymerization, they are preferably mixed or ground in the dry state with the granules of the plastic, and this mixture is plasticized and homogenized, for example on mixing rolls or in screws. However, the dyestuffs can also be added to the molten composition and they can be distributed homogeneously by stirring. The material pre-dyed in this way is then further processed in the customary manner, for example by spinning to bristles, threads and the like, or by extrusion, or by the injection moulding process to give mouldings.

Since the dyestuffs of the formula (I) are stable towards polymerization catalysts, in particular peroxides, it is also possible to add the dyestuffs to the monomeric starting materials for the plastics and then to carry out the polymerization in the presence of polymerization catalysts. For this, the dyestuffs are preferably dissolved in the monomeric components or intimately mixed with them.

The dyestuffs of the formula (I) are preferably employed for dyeing the polymers mentioned in amounts of from 0.0001 to 1% by weight, in particular from 0.01 to 0.5% by weight, based on the amount of polymer.

Corresponding valuable opaque dyeings can be obtained by addition of pigments which are insoluble in the polymers, such as, for example, titanium dioxide.

Titanium dioxide can be used in an amount of from 0.01 to 10% by weight, preferably from 0.1 to 5% by weight, based on the amount of polymer.

Transparent or opaque brilliant red, violet or blue to blue-green dyeings with a good heat stability and good fastness to light, weather and sublimation are obtained by the process according to the invention.

Mixtures of various dyestuffs of the formula (I) and/or mixtures of dyestuffs of the formula (I) with other dyestuffs and/or inorganic or organic pigments can also be employed in the process according to the invention.

The invention is explained, but not limited, by the following examples, in which the parts are stated in terms of weight and percentage data denote percentages by weight (% by wt.).

EXAMPLE 1

13.8 g of potassium carbonate (0.1 mol) and 0.5 g of Cu(II) acetate are added to 11.4 g (0.1 mol) of 1,4-cyclohexanediamine of the formula

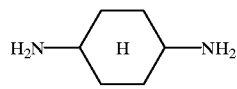

and 48.5 g (0.3 mol) of 1-chloroanthraquinone in 150 ml of N-methylpyrrolidone, while stirring, and the mixture was heated at 145 to 150° C. for 5 hours. After cooling, 300 ml of methanol were added dropwise and the dyestuff was filtered off with suction. It was then washed first with methanol and thereafter with hot water and dried at 80° C. in vacuo. The yield was 48.3 g=92% of theory, $\lambda_{max}$ 504 nm.

The dyestuff has the formula

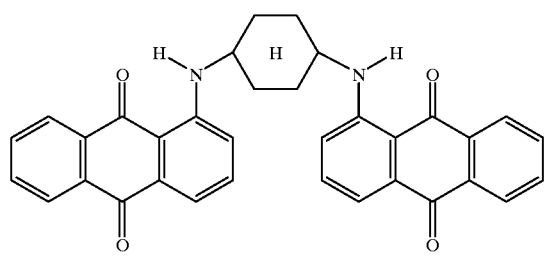

EXAMPLE 2

14.2 g (0.1 mol) of 2,5-dimethyl-1,4-cyclohexanediamine of the formula

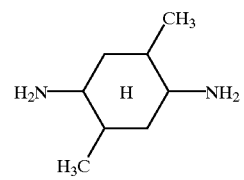

were heated to 145 to 150° C. in 150 ml of N-methylpyrrolidone with 48.5 g (0.2 mol) of 1-chloroanthraquinone and 13.8 g (0.1 mol) of potassium carbonate, while stirring, and the mixture was kept at this temperature for 7 hours.

The reaction mixture was then cooled to room temperature and diluted with 300 ml of methanol and the dyestuff which had crystallized out was isolated by filtration. It was washed with a little methanol and then with hot water and dried at 80° C. in vacuo. The yield was 47 g=85% of theory, $\lambda_{max}$ 506 nm.

The dyestuff has the formula

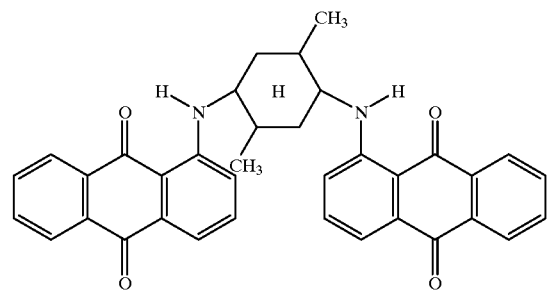

EXAMPLE 3

21.0 g (0.1 mol) of bis-(4-amino-cyclohexyl)-methane of the formula

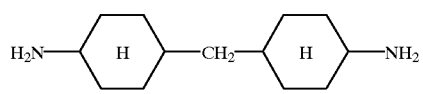

and 48.5 g (0.2 mol) of 1-chloroanthraquinone as well as 13.8 g (0.1 mol) of potassium carbonate were heated at 145 to 150° C. in 150 ml of N-methylpyrrolidone for 5 hours, while stirring. The reaction mixture was then cooled to room temperature and diluted with 300 ml of methanol and the dyestuff which had precipitated out was filtered off with suction. It was washed first with 100 ml of methanol and then with hot water and dried at 80° C. in vacuo. The yield was 54.7 g=88% of theory, $\lambda_{max}$ 514 nm.

The dyestuff has the formula

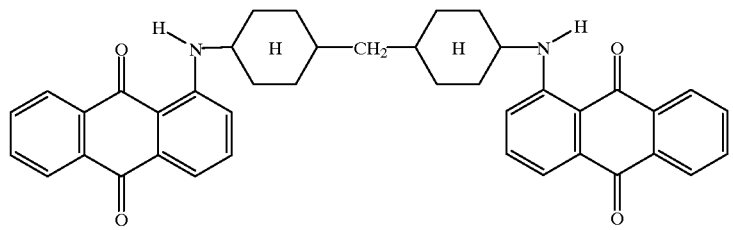

EXAMPLE 4

21.0 g (0.1 mol) of bis-(4-amino-cyclohexyl)-methane of the formula as shown in Example 3 and 54.6 g (0.2 mol) of 1-nitro-anthraquinone in 150 ml of N-methylpyrrolidone were heated at 140° C. for 4 hours, while stirring. The reaction mixture was then cooled to room temperature and diluted with 300 ml of methanol. The dyestuff which had crystallized out was filtered off, washed first with 100 ml of methanol and then with hot water and dried at 80° C. in vacuo. The yield was 51 g=82% of theory. The dyestuff has the same formula as shown in Example 3.

EXAMPLE 5

21.0 g (0.1 mol) of bis-(4-amino-cyclohexyl)-methane of the formula as in Example 3 and 65.3 g (0.2 mol) of potassium 1-anthraquinone-sulphonate as well as 7.4 g of 3-nitrobenzenesulfonic acid, Na salt (0.033 mol) and 0.5 g of copper(I) chloride were heated to 150° C. in 300 ml of water in an autoclave, a pressure of about 6 bar being established. The reaction temperature was maintained for 6 hours. After cooling to room temperature, the finished dyestuff was filtered off and washed first with hot water, then with 100 ml of methanol and again with hot water. After drying at 80° C. in vacuo, 49.7 g=80% of theory of dyestuff of the formula as in Example 3 were obtained.

EXAMPLE 6

23.8 g (0.1 mol) of bis-(4-amino-3-methyl-cyclohexyl)-methane of the formula

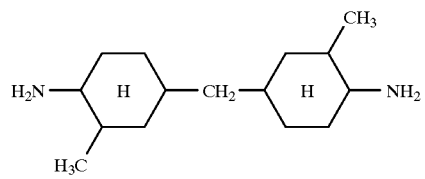

48.5 g (0.2 mol) of 1-chloroanthraquinone and 13.8 g of potassium carbonate (0.1 mol) were heated at a temperature of from 145 to 150° C. in 150 ml of N-methylpyrrolidone for 6 hours, while stirring. The reaction mixture was then cooled to room temperature, 300 ml of methanol were added and the dyestuff which had crystallized out was filtered off. After washing with methanol and hot water, the dyestuff was dried at 80° C. in vacuo. The yield was 52.6 g=81% of theory, $\lambda_{max}$ 517 nm.

The dyestuff has the formula

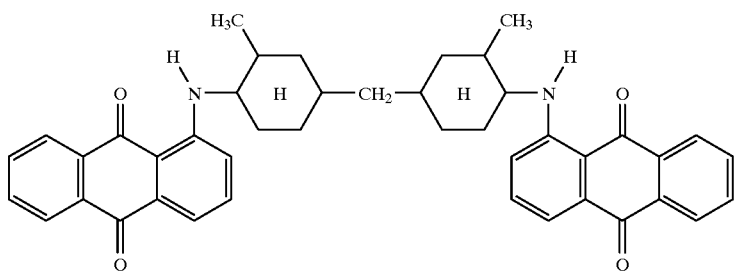

EXAMPLE 7

23.8 g (0.1 mol) of 4,4'-isopropylidene-dicyclohexylamine of the formula

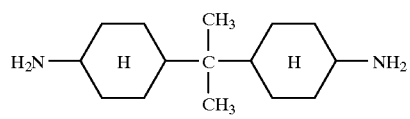

48.5 g (0.2 mol) of 1-chloroanthraquinone and 13.8 g (0.1 mol) of potassium carbonate were stirred in 150 ml of N-methylpyrrolidone at 150° C. for 6 hours. After the reaction mixture had been cooled to room temperature, it was diluted with 300 ml of methanol and the dyestuff which had precipitated out was filtered off. After washing with 100 ml of methanol and hot water, the red dyestuff was dried in vacuo at 80° C. The yield was 53.3 g=82% of theory, $\lambda_{max}$ 517 nm.

The dyestuff has the formula

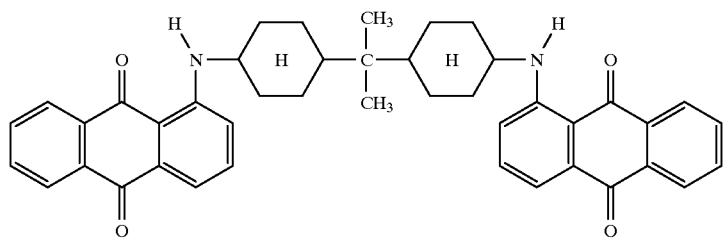

EXAMPLE 8

14.2 g (0.1 mol) of an isomer mixture of 20% of 3- and 80% of 4-aminomethyl-1-methyl-cyclohexylamine of the formula

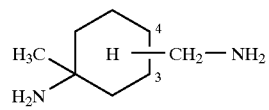

48.5 g (0.2 mol) of 1-chloroanthraquinone and 13.8 g (0.1 mol) of potassium carbonate in 150 ml of N-methylpyrrolidone were stirred at 150° C. for 6 hours. After the reaction mixture had been cooled to room temperature and diluted with 300 ml of methanol, the dyestuff was isolated by filtration, thereafter washed first with 100 ml of methanol and then with hot water and dried at 80° C. in vacuo. The yield was 46.5 g=84% of theory, $\lambda_{max}$ 505 nm.

The dyestuff has the structural formula

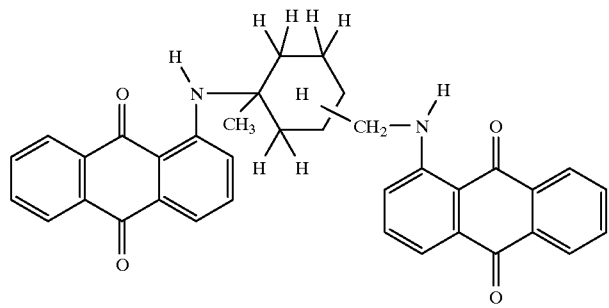

EXAMPLE 9

17.0 g (0.1 mol) of 5-amino-1-aminomethyl-1,3,3-trimethyl-cyclohexane of the formula

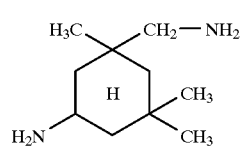

48.5 g (0.2 mol) of 1-chloroanthraquinone and 13.8 g (0.1 mol) of potassiuim carbonate in 150 ml of dimethylformamide were stirred at 150° C. for 6 hours. After the reaction mixture had been cooled to room temperature and 300 ml of methanol had been added, the dyestuff which had crystallized out was filtered off, washed first with 100 ml of methanol and then with hot water and dried at 80° C. in vacuo. The yield was 48.9 g=84% of theory, $\lambda_{max}$ 506 nm.

The dyestuff has the formula

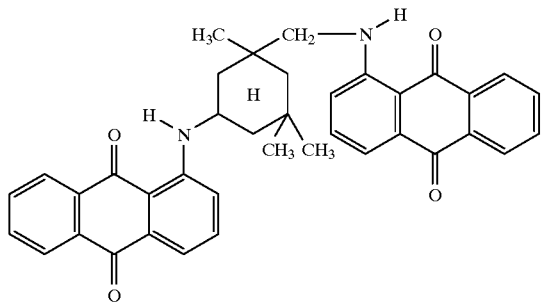

EXAMPLE 10

14.2 g (0.1 mol) of 1,4-diaminomethyl-cyclohexane of the formula

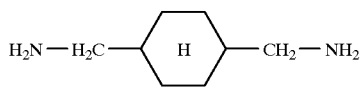

48.5 g (0.2 mol) of 1-chloroanthraquinone and 13.8 g (0.1 mol) of potassium carbonate were heated at a temperature of from 145 to 150° C. in 150 ml of dimethylformamide for 6 hours, while stirring.

Thereafter, the reaction mixture was cooled to room temperature and 300 ml of methanol were added. The dyestuff which had crystallized out was filtered off, washed first with 101 ml of methanol and then with hot water and dried at 80° C. in vacuo. The yield was 44.3 g=80% of theory.

The dyestuff has the formula

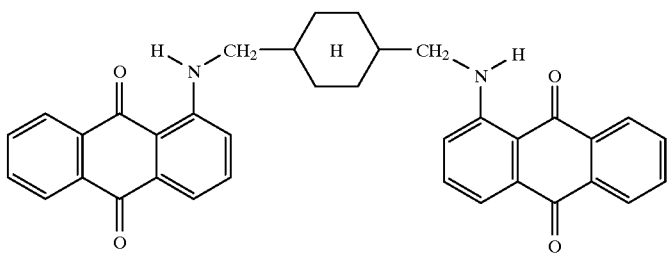

EXAMPLE 11

100 g of polystyrene granules and 0.02 g of the dyestuff from Example 3 were mixed intensively in a drum mixer for 15 minutes. The granules coloured in the dry state were processed on a screw injection moulding machine at 240° C. Transparent red sheets of very good fastness to light were obtained. Instead of polystyrene, copolymers with butadiene and acrylonitrile were also used. When 0.5 g of titanium dioxide were additionally added, strong opaque dyeings were obtained.

DYE EXAMPLE 1

100 g of polypropylene granules and 0.1 g of the dyestuff from Example 3 were mixed in a drum mixer, with the addition of a few drops of propylene glycol as an adhesion promoter, for 15 minutes. The polypropylene granules covered externally with dyestuff were then processed on a screw injection moulding machine at 280° C. Transparent red sheets of very good fastness to light were obtained. The dyeings show no bleeding. When 2% of titanium dioxide was also additionally added to the dyestuff, strong opaque dyeings were obtained.

EXAMPLE 12

17.2 g (0.05 mol) of 1-methoxy-4-(4-methylphenylamino)-anthraquinone, 4.3 g (0.025 mol) of isophoronediamine and 0.2 g of copper powder were added to 150 ml of o-dichlorobenzene and the mixture was stirred at 170° C. for 12 hours, while passing over nitrogen. During this operation, methanol and about 100 ml of o-dichlorobenzene was allowed to distill off. After cooling to 80° C., 200 ml of methanol were added. After cooling to room temperature, the precipitate was filtered off, washed successively with methanol, water, 10% strength hydrochloric acid and again with water and dried. 16.2 g (82% of theory) of the dyestuff of the formula

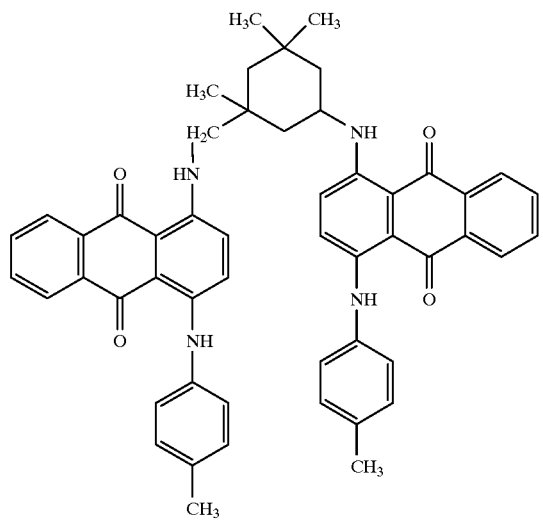

were obtained.

Clear transparent green-tinged blue dyeings which are heat-stable at 300° C., have good light-fastness properties and show practically no sublimation in an injection moulding machine were obtained in plastics such as polystyrene and polypropylene.

EXAMPLE 13

17.2 g (0.05 mol) of 1-methoxy-4-(4-methylphenylamino)-anthraquinone, 5.25 g of 4,4'-methylenebiscyclohexylamine (0.025 mol) and 0.15 g of copper powder were added to 120 ml of o-dichlorobenzene and the mixture was stirred at 170° C. for 15 hours, while passing over nitrogen. During this procedure, methanol and about 70 ml of o-dichlorobenzene were distilled off. After cooling to 90° C., 150 ml of methanol were added, the mixture was cooled to room temperature and the precipitate was filtered off, washed with methanol, water, 10% strength hydrochloric acid and again with water and dried. 16.2 g (78% of theory) of the dyestuff of the formula

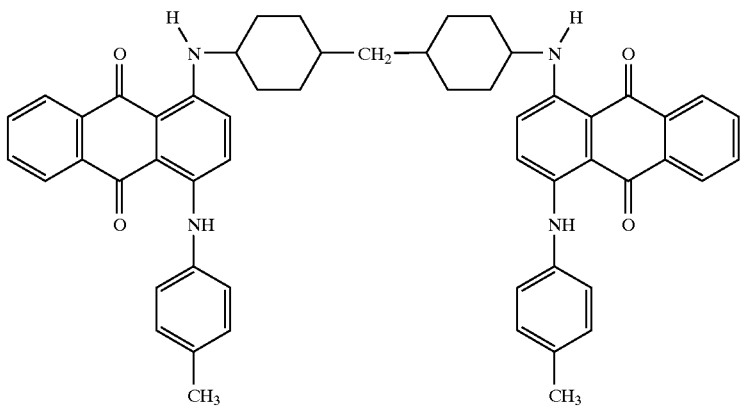

were obtained.

When incorporated into plastics such as polypropylene, polystyrene, polycarbonate and polyethylene, transparent green-blue dyeings which, in an injection moulding machine, are stable up to 300° C., show practically no sublimation and have good light-fastness properties were obtained.

EXAMPLE 14

17.2 g (0.05 mol) of 1-methoxy-4-(4-methyl-phenyl-amino)-anthraquinone, 5.95 g (0.025 mol) of 4,4'-methylenebis-(2-methylcyclohexylamine) and 0.15 g of copper powder were added to 120 ml of ditolyl ether and the mixture was stirred at 170° C. for 20 hours, while passing over nitrogen. During this procedure, methanol was distilled off. After cooling to 100° C., 100 ml of n-butanol were added dropwise. During this procedure, the mixture was allowed to cool to room temperature. The precipitate was filtered off, washed with a little n-buranol, with methanol and then water and dried. 16.3 g (76% of theory) of the dyestuff of the formula are stable up to 300° C., show practically no sublimation and have good light-fastness properties.

EXAMPLE 15

18.6 g of 4-nitro-1-benzoylamino-anthraquinone (0.05 mol), 5.25 g of 4,4'-methylenebiscyclohexylamine (0.025 mol), 7.6 g of potassium carbonate (0.055 mol) and 0.3 g of copper(II) acetate were introduced into 100 ml of N-methylpyrrolidone, while stirring. The mixture was heated at a temperature of 100° C. for 8 hours, while passing over nitrogen. Thereafter, 150 ml of methanol were added to the reaction mixture and the precipitate was filtered off, washed with a mixture of NMP/methanol (1:1), washed with hot methanol and then with hot water and dried in vacuo. A dyestuff of the formula

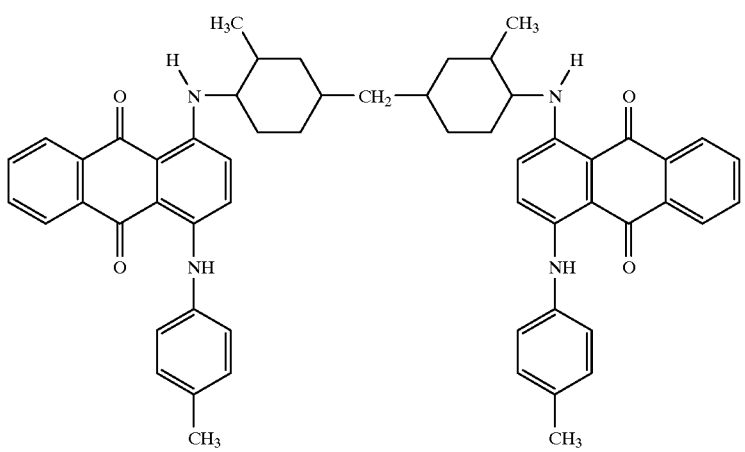

were obtained.

Plastics such as polystyrene, polypropylene, polyethylene and polycarbonate were dyed in transparent green-tinged blue shades. In an injection moulding machine, the dyeings

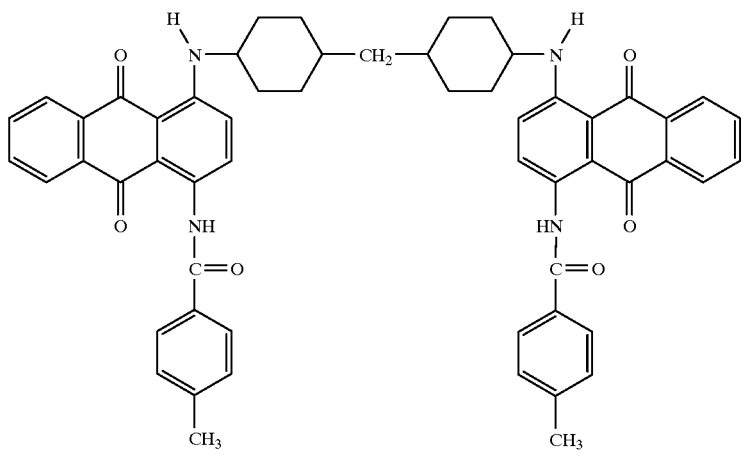

was obtained.

The yield was 13.1 g (64% of theory). In an injection moulding machine, transparent violet dyeings which are stable up to 300° C., are fast to sublimation and have a good fastness to light were obtained in the plastics polystyrene, polypropylene, polyethylene and polycarbonate.

EXAMPLE 16

18.6 g (0.05 mol) of 4-nitro-1-benzoylamino-anthraquinone, 4.3 g of isophorone-diamine (0.025 mol), 7.6 g of potassium carbonate (0.055 mol) and 0.3 g of copper(II) acetate were introduced into 150 ml of N-methylpyrrolidone, while stirring. The reaction mixture was heated to 80 to 85° C., while passing over nitrogen, and kept at this temperature for 12 hours. 100 ml of methanol were then added and the precipitate was filtered off at room temperature, washed with 30 ml of N-methyl-pyrrolidone in portions, washed with methanol and then with water and dried at 80° C. in vacuo. 12.9 g (63% of theory) of a violet dyestuff of the formula

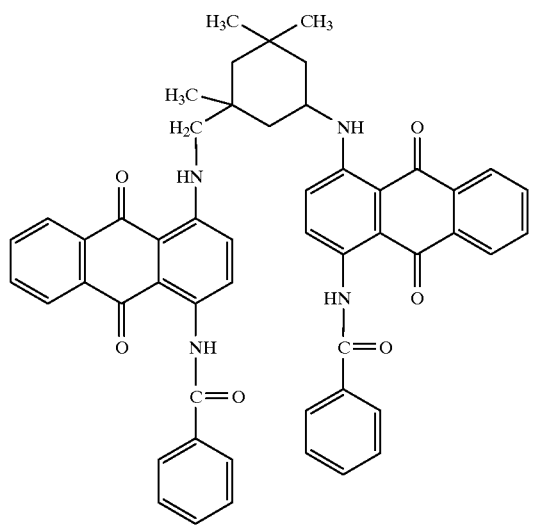

were obtained.

The plastics polystyrene, copolymers of acrylonitrile, butadiene and styrene, polypropylene and polycarbonate were dyed in transparent shades with this dyestuff in an injection moulding machine at temperatures up to about 300° C. The dyeings have a good fastness to light and are fast to sublimation.

EXAMPLE 17

20.0 g (0.05 mol) of 4-nitro-1-(4-methyl-benzoylamino)-anthraquinone, 4.3 g of iso-phoronediamine (0.025 mol), 7.6 g of potassium carbonate and 0.2 g of copper(II) acetate were introduced into 150 ml of N-methylpyrrolidone, while stirring, and the mixture was heated at 95° C. for 12 hours. 100 ml of methanol were then added dropwise and the precipitate was filtered off at room temperature, washed with 30 ml of N-methylpyrrolidone, with methanol and thereafter with water and dried. The violet dyestuff of the formula

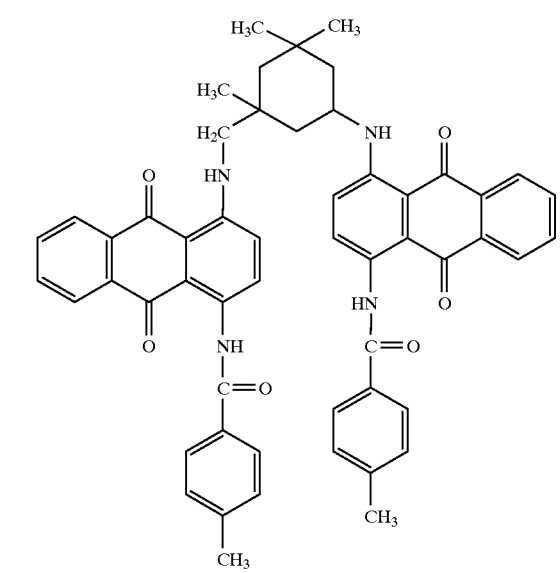

was obtained in a yield of 66% (of theory).

The dyestuff dyes polystyrene, polypropylene, polyethylene and polycarbonate in each case in transparent violet shades, the dyeings being stable in an injection moulding machine up to 300° C. They have a good fastness to light and are fast to sublimation.

EXAMPLE 18

10 g of 1-amino-4-hydroxy-anthraquinone and 2.0 g of leuko-1-amino-4-hydroxy-anthraquinone (these two components together represented 0.05 mol) as well as 5.3 g of 4,4'-methylenebiscyclohexylamnine, 2 g of hydroxyacetic acid and 0.2 g of boric acid were introduced into 150 ml of ethanol, while stirring. The mixture was then heated under reflux at the boiling point for 12 hours. Thereafter, 50 ml of n-butanol were added and the reaction mixture was kept at 82° C. for a further 3 hours. Finally, air was passed through at 70° C. for 2 hours, 6 g of KOH flakes were also added and the precipitate was also filtered off at 60° C. for 1 hour, washed with methanol and then with water and dried. After recrystallization from glacial acetic acid, 10.1 g (62% of theory) of a red-tinged blue dyestuff of the formula

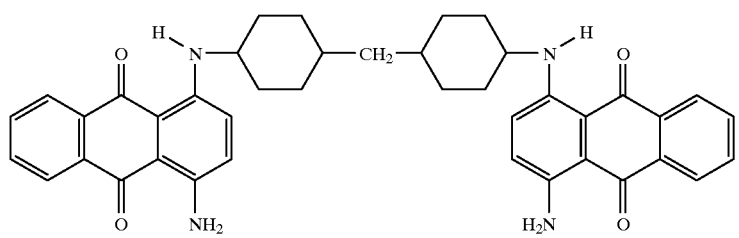

were obtained.

When incorporated into the plastics polystyrene, polypropylene, polyethylene and polycarbonate with the aid of an injection moulding machine, in each case transparent dyeings were obtained. The dyeings have good sublimation- and light-fastness properties.

EXAMPLE 19

17.2 g (0.05 mol) of 1-methoxy-4-(4-methylphenylamino)anthraquinone, 2.85 g (0.025 mol) of 1,4-cyclohexyldiamine and 0.1 g of copper powder were added to 120 ml of o-dichlorobenzene and the mixture was stirred at 170° C. for 9 hours, while passing over nitrogen. During this procedure, methanol and about 70 ml of o-dichlorobenzene were allowed to distil off. After cooling to 80° C., 150 ml of methanol were added and, after cooling to room temperature, the precipitate was filtered off, washed with methanol, with water, with 10% strength hydrochloric acid and again with water and dried. 14.1 g (77% of theory) of a dyestuff having the formula

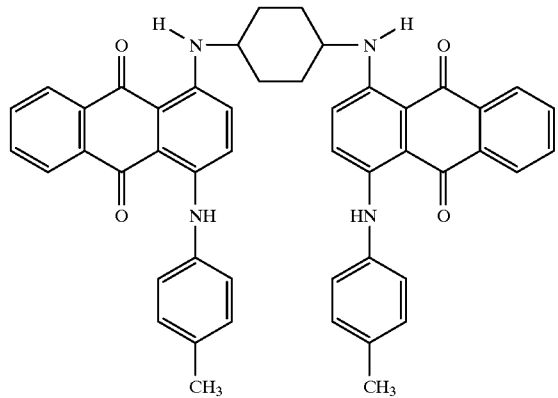

were obtained.

The dyestuff was incorporated into the plastics polystyrene, polypropylene and polycarbonate with the aid of an extruder, blue transparent dyeings being obtained at temperatures of up to 300° C. The dyeings have a good fastness to sublimation and fastness to light.

DYEING EXAMPLE 2

100 g of polystyrene granules and 0.02 g of the dyestuff from Example 14 were mixed intensively in a drum mixer for 15 minutes. The granules coloured in the dry state were processed on a screw injection moulding machine at 240° C. Transparent blue sheets of very good fastness to light were obtained. Instead of polystyrene, copolymers with butadiene and acrylonitrile were also used. When 0.5 g of titanium dioxide was additionally added, strong opaque dyeings were obtained.

What is claimed is:

1. A compound of the formula (I)

$$R^1\text{—NH—B—NH—}R^2 \qquad (I),$$

wherein $R^1$ and $R^2$ independently of one another denote a radical of the formula

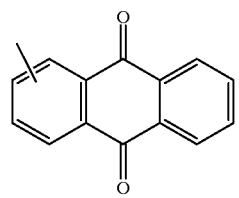

wherein each said radical is independently unsubstituted or substituted with OH, amino or substituted amino, aryloxy, halogen, alkyl, or alkoxy, and B represents an unsubstituted or substituted cycloalkylene-containing bridge member.

2. The compound according to claim 1, wherein the radicals $R^1$ and $R^2$ are unsubstituted.

3. The compound according to claim 1, which corresponds to the formula (Ia)

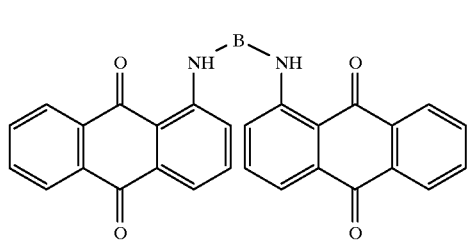

wherein B represents an unsubstituted or substituted cycloalkylene-containing bridge member.

4. The compound according to claim 1 corresponding to the formula (Ib)

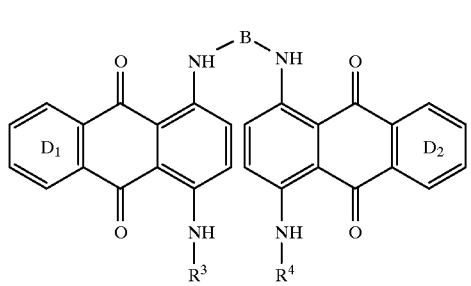

wherein $R^3$ and $R^4$ independently of one another represent hydrogen or unsubstituted or substituted alkyl, aryl or aroyl, rings $D_1$ and $D_2$ independently of one another are unsubstituted or substituted with OH, amino or substituted amino, aryloxy, halogen, alkyl, or alkoxy, and B represents an unsubstituted or substituted cycloalkylene-containing bridge member.

5. The compound according to claim 4, wherein $R^3$ and $R^4$ independently of one another denote hydrogen; $C_1$–$C_4$-alkyl which is unsubstituted or substituted by halogen and/or phenyl; or phenyl or benzoyl which are unsubstituted or substituted by halogen, alkyl or acylamino.

6. The compound according to claim 4, wherein rings $D_1$ and $D_2$ are unsubstituted.

7. The compound according to claim 4, wherein the radicals $R^3$ and $R^4$ independently of one another represent hydrogen, phenyl, 4-methylphenyl, benzoyl or 4-methylbenzoyl.

8. The compound according to claim 1, wherein the cycloalkylene denotes $C_5$–$C_7$-cycloalkylene.

9. The compound according to claim 1, wherein the cycloalkylene is cyclopentylene or 1,3- or 1,4-cyclohexylene.

10. The compound according to claim 1, wherein the bridge member B corresponds to a radical of the formula (II)

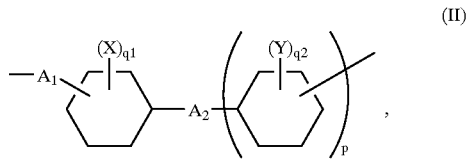

wherein
q1 and q2 independently of one another represent a number from 0 to 4,
X and Y independently of one another denote alkyl or halogen, where if q1 is greater than or equal to 2, X can in each case assume identical or different meanings, and if q2 is greater than or equal to 3, Y can in each case assume identical or different meanings,
$A_1$ represents a linear or branched $C_1$–$C_4$-alkylene radical,
$A_2$ represents a linear or branched $C_1$–$C_4$-alkylene radical, and
p denotes 0 or 1.

11. The compound according to claim 1, wherein their bridge member B corresponds to a radical of the formula (II)

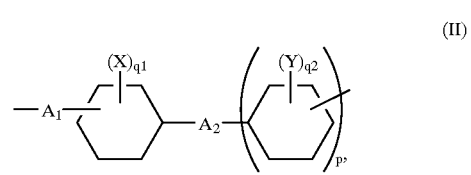

wherein
q1 and q2 independently of one another represent a number from 0 to 4,
X and Y independently of one another denote $C_1$–$C_4$-alkyl or Cl, Br and F, where if q1 is greater than or equal to 2, X can in each case assume identical or different meanings, and if q2 is greater than or equal to 3, Y can in each case assume identical or different meanings,
$A_1$ represents

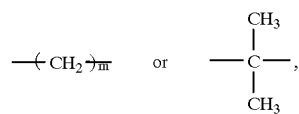

$A_2$ represents

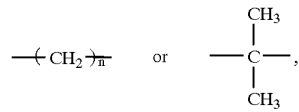

wherein
m and n independently of one another represent a number from 0 to 4 and
p denotes 0 or 1.

12. The compound according to claim 1, wherein the cycloalkylene radical or radicals in the bridge member B are cyclohexylene radicals which independently of one another are linked in the 1,3- or 1,4-position.

13. The compound according to claim 1, wherein the bridge member B corresponds to (a)

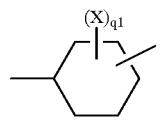
(IIa)

wherein
q1 represents a number from 0 to 4 and
X denotes alkyl or halogen, where if q1 is greater than or equal to 2, X can in each case assume identical or different meanings, (b)

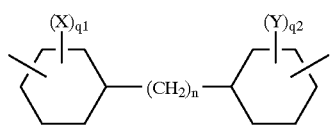
(IIb)

wherein
q1 and q2 independently of one another represent a number from 0 to 4,
X and Y independently of one another denote alkyl or halogen, where if q1 is greater than or equal to 2, X can in each case assume identical or different meanings, and if q2 is greater than or equal to 2, Y can in each case assume identical or different meanings, and
n represents a number from 0 to 4, (c)

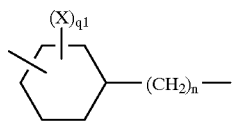
(IIc)

wherein
q1 represents a number from 0 to 4,
X denotes alkyl or halogen, where if q1 is greater than or equal to 2, X can in each case assume identical or different meanings, and
n represents a number from 0 to 4, (d)

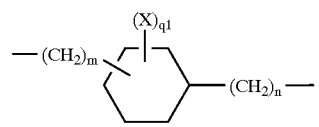
(IId)

wherein
q1 represents a number from 0 to 4,
X denotes alkyl or halogen, where if q1 is greater than or equal to 2, X can in each case assume identical or different meanings, and
m and n independently of one another represent a number from 0 to 4, or (e)

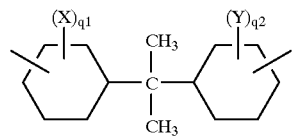
(IIe)

wherein
q1 and q2 independently of one another represent a number from 0 to 4 and
X and Y independently of one another denote alkyl or halogen, where if q1 is greater than or equal to 2, X can in each case assume identical or different meanings, and if q2 is greater than or equal to 2, Y can in each case assume identical or different meanings.

14. The compound according to claim 1, wherein the bridge member B corresponds to (a)

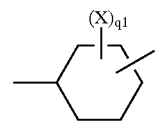
(IIa)

wherein
X represents chlorine or methyl and
q1 represents 0 or 1, (b)

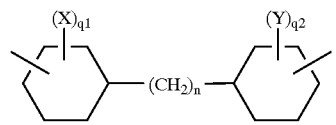
(IIb)

wherein
X and Y in each case denote methyl,
q1 and q2 independently of one another denote 0 or 1 and
n represents 0 or 1, (c)

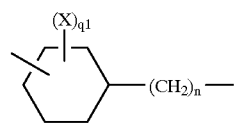
(IIc)

wherein
X represents methyl,
q1 represents 0, 1, 2 or 3 and
n represents 1, (d)
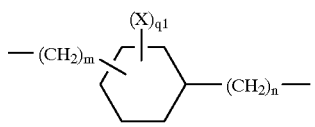
(IId)
wherein
m and n in each case denote 1,
X denotes methyl and
q1 represents 0 or 1, or
(e)
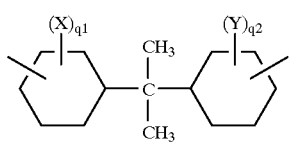
(IIe)
wherein
X and Y denote methyl and
q1 and q2 independently of one another represent 0 or 1.
15. The compound according to claim 1, wherein the bridge member B is
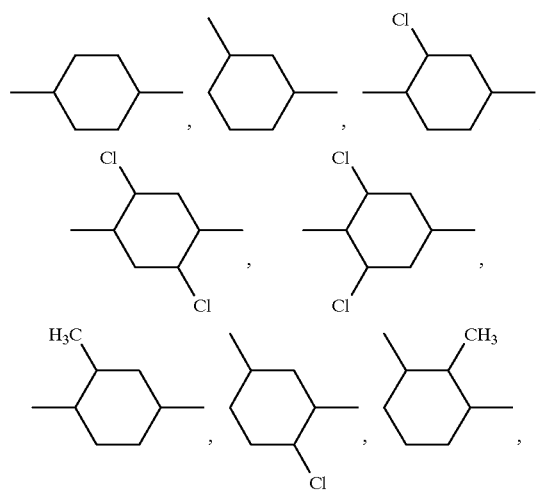
-continued
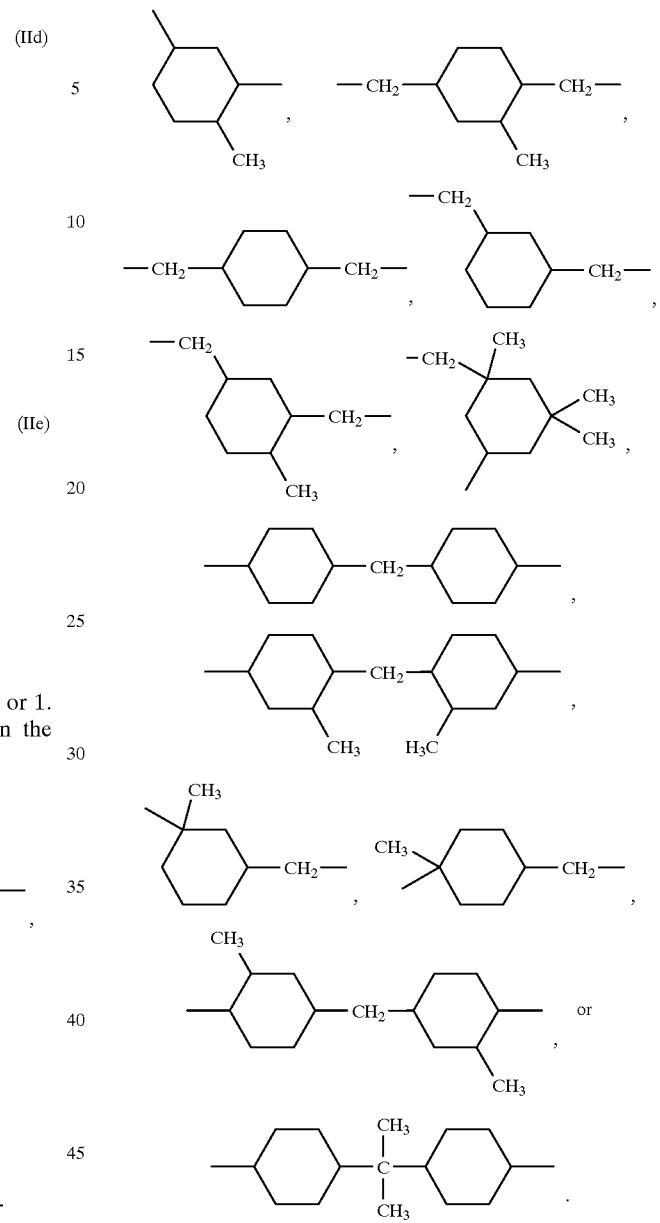
* * * * *